E. L. Pratt,
Cheese Cover,
N° 24,521.  Patented June 21, 1859.
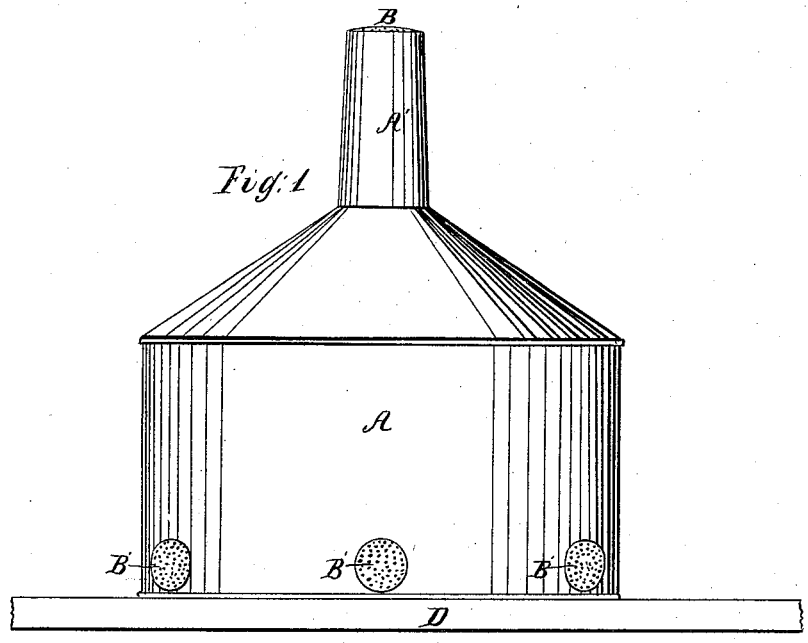
Fig. 1
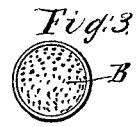
Fig. 2  Fig. 3
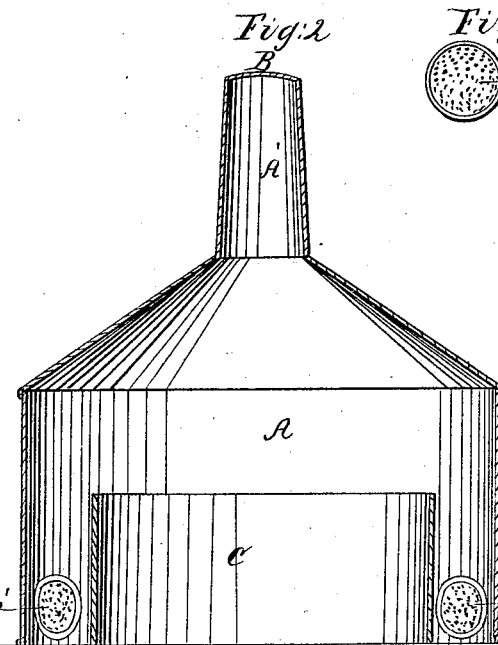
Witnesses  Inventor
E. L. Pratt

UNITED STATES PATENT OFFICE.

E. L. PRATT, OF PHILADELPHIA, PENNSYLVANIA, ASSIGNOR TO HIMSELF AND R. B. FITTS, OF SAME PLACE.

CHEESE-COVER.

Specification of Letters Patent No. 24,521, dated June 21, 1859.

*To all whom it may concern:*

Be it known that I, E. L. PRATT, of the city of Philadelphia, in the State of Pennsylvania, have invented a new and improved portable ventilating cover for better preserving and keeping cheese and other articles of diet from the destroying agencies of heat and light and also their better protection from animals, vermin, or insects; and I do hereby declare that the following is a full, clear, and exact description of the construction and operation of the same, reference being had to the annexed drawings, making a part of this specification, in which—

Figure 1 is a perspective view, and Fig. 2, a vertical section of the same and a contained vessel, like letters, in both figures, indicating the same parts.

The object of my improved self ventilating cover is, to ventilate and expose to a cool current of air, cheese and other articles of diet subject to change, and at the same time to better protect the same from the destructive agencies of light and heat, and the depredations of animals, vermin, or insects; and it consists in so constructing said cover, that when it is placed over cheese, or other articles of diet subject to change, with its open end in close contact with or upon any supporting object having an even plane—as a table, shelf or other similar support—it shall form a cover closed on all sides with the exception of one or more series of minute perforations, at or near its lower edge, for the entrance of cold or fresh air, and a series of openings consisting of minute perforations at or near the top, for the escape of warmed air, moisture and gases.

In the drawings, A, represents the body of the said cover; A', a continuation of the same in the form of a tapering tube which serves as a handle; B, the series of perforations above; B', the series of like perforations below; C, a vessel, representing, either a cheese or a vessel for holding liquid or food; and, D, the shelf or plane upon which A and C, rest.

The body (A) is made of tinned plates, or of any other suitable material, its lower part being in the form of a hollow cylinder, perforated around near its lower edge, and its upper part in the form of a hollow frustum of a cone permanently connected thereto and surmounted by a fixed tapering tube (A') opening therein, and having its upper end covered by a perforated plate (B) constructed (substantially as shown in Fig. 3) of tinned plate, or of fine wire gauze or other suitably perforated material.

The lower perforations (B') are made either through separate plates soldered fast so as to extend over large openings made at regular distances apart through the sides of the body (A) near its bottom edge, as shown in the drawings, or, of fine wire gauze, or other similar material, applied over the said large openings in the same manner. These perforations (B') may, if so preferred, be made directly through the plates or walls of the body (A), at the same parts. The perforations in both of the said series (B and B') are made so minute in size that the smallest insect to which such articles of diet, as are intended to be placed under the cover, are attractive, cannot pass through them, but yet so numerous as to admit of an abundant entrance of cool or fresh air through the lower ones, and also a free exit of the warmed air, moisture, or gases of the interior, through the perforations (B) at the top of the said cover.

It will be evident that when cheese and other changing articles of diet, intended to be better preserved or protected, are placed upon an even surface—as a shelf or table—and then covered accurately by one of these covers, the light will be precluded as well as insects, while a free escape of any gases or moisture generated therein, will, at the same time, be permitted; and that therefore the usual tendency or predisposition to decomposition and moldiness will be retarded or greatly diminished; and also that when any warm articles are covered therewith, they will not only be protected from light and insects, but that a refrigerating current or currents of fresh air will be caused to enter and pass through the cover—results, often of the highest importance to the proper preservation of many such articles of diet.

Having received Letters Patent dated, March 29th, 1859, for a certain new article of manufacture, or milk vessel consisting of a pan and cover so constructed and combined together as to provide for or induce "a current of fresh cool air through the same, and for excluding insects," I therefore do not desire to claim, herein, anything included in the said patent; but having herein fully pointed out the peculiarities of the present improved cover, I wish it to be understood that I do not confine its construction to the precise form or shape described or shown; but,

What I claim as new and of my invention, and desire to secure by Letters Patent is,

As an improved article of manufacture for the purposes herein described, a ventilating cover constructed of tinned plate or other suitable material, so as to protect articles placed therein from the rays of light and heat and the ravages of animals or insects, and at the same time secure perfect ventilation, by means of a series of small perforations at or near the base or bottom for the inlet of cool air and another series of perforations, at or near the top, for the escape of warm air, moisture and gases, as herein set forth and described.

E. L. PRATT.

Witnesses:
 BENJ. MORISON,
 JNO. B. KENNEY.